United States Patent
AlQatari

(10) Patent No.: US 12,429,625 B2
(45) Date of Patent: Sep. 30, 2025

(54) SYSTEMS AND METHODS FOR IDENTIFYING FRACTURES WITHIN A GEOLOGICAL FORMATION

(71) Applicant: SAUDI ARABIAN OIL COMPANY, Dhahran (SA)

(72) Inventor: Ammar AlQatari, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 442 days.

(21) Appl. No.: 18/163,544

(22) Filed: Feb. 2, 2023

(65) Prior Publication Data
US 2024/0272325 A1     Aug. 15, 2024

(51) Int. Cl.
*G06V 10/00*     (2022.01)
*G01V 11/00*     (2006.01)
(Continued)

(52) U.S. Cl.
CPC .............. *G01V 11/00* (2013.01); *G06N 3/088* (2013.01); *G06V 10/763* (2022.01);
(Continued)

(58) Field of Classification Search
CPC   G06N 3/08; G06N 3/02; G06N 3/088; G06N 3/042; G06N 3/045; G06N 3/047;
(Continued)

(56) References Cited

U.S. PATENT DOCUMENTS

| | | | |
|---|---|---|---|
| 4,072,193 A * | 2/1978 | Sarda | E21B 43/267 166/280.1 |
| 4,432,078 A * | 2/1984 | Silverman | G01V 1/42 166/308.1 |

(Continued)

FOREIGN PATENT DOCUMENTS

CN     105842754 A     8/2016

OTHER PUBLICATIONS

G. Treadgold et al., "Azimuthal Processing for Fracture Prediction and Image Improvement", SEG Las Vegas 2008, pp. 988-992 (5 pages).

(Continued)

*Primary Examiner* — Amir Alavi
(74) *Attorney, Agent, or Firm* — Osha Bergman Watanabe & Burton LLP

(57) ABSTRACT

A method for identifying fractures within a geological formation is provided. The method includes obtaining a plurality of images from within a first well located within the geological formation, wherein at least one image of the plurality of images comprises an identified fracture in the geological formation, obtaining a first mudlogging dataset associated with the plurality of images, correlating one or more helium measurements from the first mudlogging dataset with each image of the plurality of images via a machine learning engine to train a machine learning model to obtained a trained machine learning model, obtaining, by the trained machine learning model, a second mudlogging dataset associated with an interval of a second well, and determining a presence of one or more fractures in the interval of the second well by the machine learning model based on helium content determined from the second mudlogging dataset.

20 Claims, 8 Drawing Sheets

(51) Int. Cl.
*G06N 3/088* (2023.01)
*G06V 10/762* (2022.01)
*G06V 10/774* (2022.01)
*G06V 10/776* (2022.01)
*G06V 10/80* (2022.01)
*G06V 10/82* (2022.01)

(52) U.S. Cl.
CPC .......... *G06V 10/774* (2022.01); *G06V 10/776* (2022.01); *G06V 10/80* (2022.01); *G06V 10/82* (2022.01)

(58) Field of Classification Search
CPC ...... G06N 3/082; G06N 3/092; G06N 3/0454; G06N 3/0475; G06N 3/0464; G06V 10/82; G06V 10/774; G06V 10/763; G06V 10/776; G06V 10/80; G01V 11/00
See application file for complete search history.

(56) References Cited

U.S. PATENT DOCUMENTS

| | | | | |
|---|---|---|---|---|
| 4,607,697 A | * | 8/1986 | Urffer | C09K 8/80 166/280.2 |
| 4,616,702 A | * | 10/1986 | Hanson | E21B 47/12 324/355 |
| 5,025,859 A | * | 6/1991 | Hanson | E21B 43/17 166/308.1 |
| 5,589,603 A | * | 12/1996 | Alexander | B09B 1/008 166/305.1 |
| 6,838,418 B2 | * | 1/2005 | Allan | C09K 8/685 507/224 |
| 7,841,397 B2 | * | 11/2010 | Hamilton | E21B 33/124 166/308.1 |
| 8,060,309 B2 | | 11/2011 | Xue et al. | |
| 8,494,827 B2 | | 7/2013 | Mutlu et al. | |
| 9,410,406 B2 | * | 8/2016 | Yuan | E21B 43/26 |
| 11,542,791 B1 | * | 1/2023 | Rosenberg | E21B 47/007 |
| 2003/0205376 A1 | * | 11/2003 | Ayoub | E21B 47/09 166/250.1 |
| 2020/0225381 A1 | | 7/2020 | Walles et al. | |
| 2024/0272325 A1 | * | 8/2024 | AlQatari | G06V 10/763 |

OTHER PUBLICATIONS

B. Cecconi et al., Helium detection at wellsite: a powerful geochemical tool, OMC-2017-814, pp. 1-10 (10 pages).

A. Qatari et al., A Novel Approach to Analyze Fracture Properties Utilizing Advanced Mud Logging, IADC/SPE Asia Pacific Drilling Technology Conference and Exhibition, Aug. 2022, Paper No. SPE-209834-MS (5 pages).

* cited by examiner

SYSTEMS AND METHODS FOR IDENTIFYING FRACTURES WITHIN A GEOLOGICAL FORMATION

BACKGROUND

Identifying fractures in a geological formation can be a challenging task in which specific and often costly acquisition criteria are implemented to facilitate the identification. Limitations of running specific acquisition tools across a non-reservoir section of a well are further challenging and often, cost ineffective.

Mudlogging can be an alternative cost-efficient tool that can be run to identify fractures across a well interval, and helium is an element that can be measured using advanced mudlogging methods.

Mudlogging is a wellsite operation which can be used to investigate, record, and analyze measurements obtained from a drilling fluid circulating in a drilling rig. The drilling fluid, often water or a saline solution, typically includes various drill cuttings and gases, for example, helium.

Mudlogging can play an important role in the identification of downhole geological conditions such as hydrocarbon presence and stratigraphy along with monitoring drilling conditions to ensure safety of operations and improve efficiency. Advanced mudlogging can provide a quantitative hydrocarbon measurement from the drilling mud rather than the qualitative measurements that regular mudlogging provides.

Mudlogging can provide measurements of detected helium which may act as indicator of permeability in a formation. Currently, mud log images are manually processed to detect and diagnose fractures within a formation. However, this can be costly and time consuming, while accuracy and precision being subject to human error.

Accordingly, there exists a need for improved systems and methods for determining formation permeability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present inventors have recognized that improvements in mud log analysis would be useful for more accurate and precise prediction of formation permeability.

According to embodiments of the present disclosure, a method for identifying fractures within a geological formation is provided. The method includes obtaining a plurality of images from within a first well located within the geological formation, wherein at least one image of the plurality of images comprises an identified fracture in the geological formation, obtaining a first mudlogging dataset associated with the plurality of images, correlating one or more helium measurements from the first mudlogging dataset with each image of the plurality of images via a machine learning engine to train a machine learning model to obtained a trained machine learning model, obtaining, by the trained machine learning model, a second mudlogging dataset associated with an interval of a second well, and determining a presence of one or more fractures in the interval of the second well by the machine learning model based on helium content determined from the second mudlogging dataset.

The correlating may be performed at least in part using a multi-resolution graphical clustering (MRGC).

The second mudlogging dataset may consist of gamma ray data and C-n gas data.

The correlating may be performed using a first step of unsupervised clustering based on the image logs, and a second step of a supervised helium prediction based on gamma ray data and C-n gas data comprised by the first mudlogging dataset. \

The method may further include predicting the helium content based exclusively on the C-n gas data.

Inputs to the machine learning model during the correlating may include the helium content, the gamma ray data, and at least one image of the plurality of images.

The machine learning engine may be a k-nearest neighbor neural network trained with a clustered training dataset, the clustered training dataset including statistically ranked data prepared using an MRGC process to find similarities in patterns per data point.

The MRGC process may use a mudlogging helium data ranking to compare offset data from an image of the plurality of images to a weight value corresponding to change impact per data point and to assign a rank to an input based on the weight value.

The method may further include validating the machine learning model based on actual captured helium data from a third mudlogging dataset corresponding to a plurality of wellbores within the geological formation, and determining a margin error based on the validating.

The machine learning engine may be configured to identify associated inputs from the first mudlogging dataset during the correlating.

According to further embodiments of the disclosure, a non-transitory computer readable medium storing instructions that when executed by a processor cause the processor to carry out a method for identifying fractures within a geological formation ius provided. The method includes obtaining a plurality of images from within a first well located within the geological formation, wherein at least one image of the plurality of images comprises an identified fracture in the geological formation, obtaining a first mudlogging dataset associated with the plurality of images, correlating one or more helium measurements from the first mudlogging dataset with each image of the plurality of images via a machine learning engine to prepare a machine learning model, obtaining, by the machine learning model, a second mudlogging dataset associated with an interval of a second well, and determining a presence of one or more fractures in the interval of the second well by the machine learning model based on a helium content determined from the second mudlogging dataset.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1A:
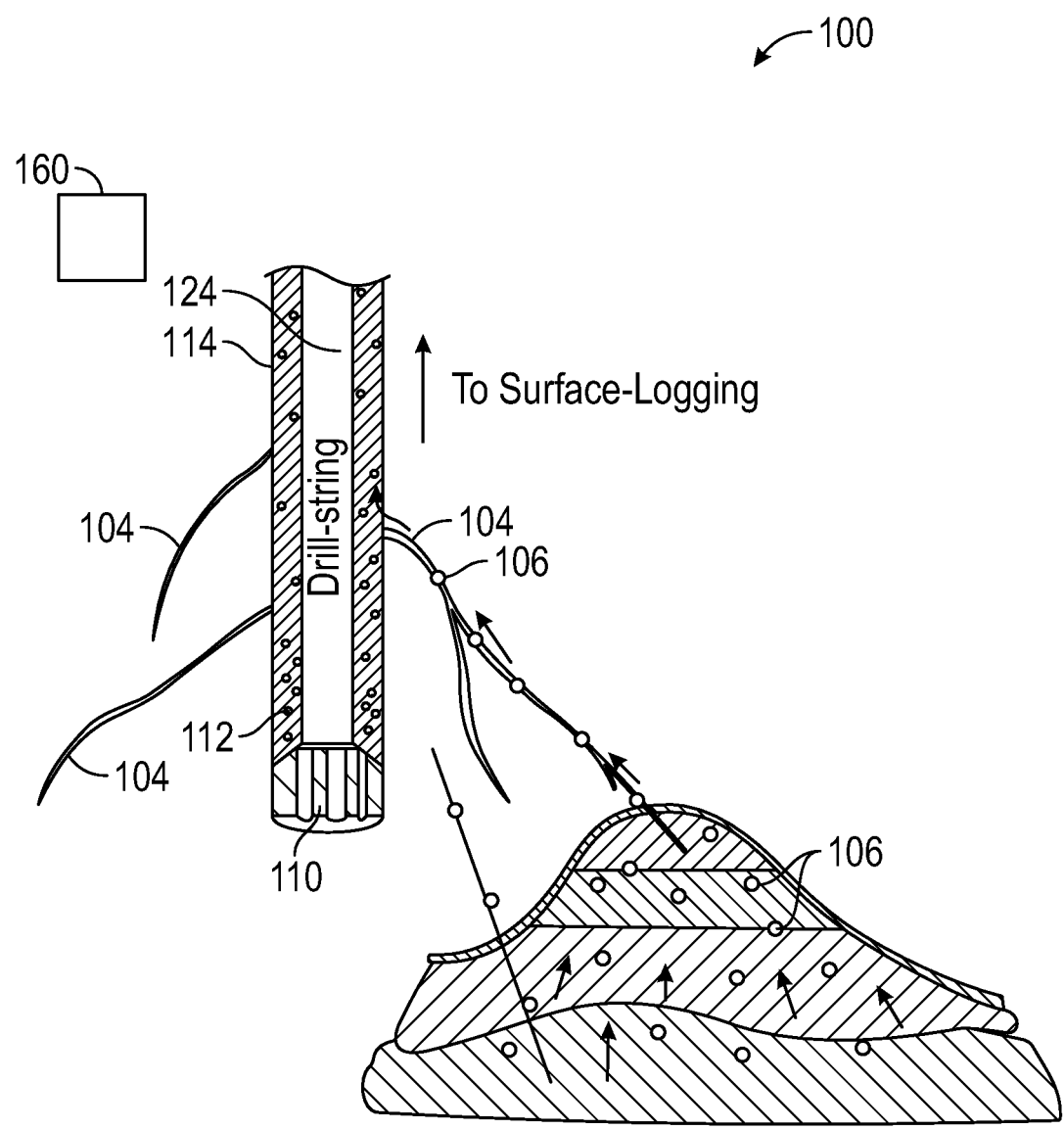
FIG. 1A shows an illustrative drilling system operating within a geological formation according to embodiments of the present disclosure.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments of the present disclosure use helium as a correlator of fractures within a formation in terms of identification and measurements along with tracking the fracture with time. In embodiments disclosed herein, a machine learning model is used to predict and generate helium readings in areas where only regular mudlogging is provided. The helium prediction can provide a substantial economical and efficiency measure to daily operations.

In addition, by implementing such a solution to detect and predict potential fractures, potential loss circulations and/or operational issues that stem from an unidentified crossed fracture in a well can be more effectively mitigated.

Figure 1B:
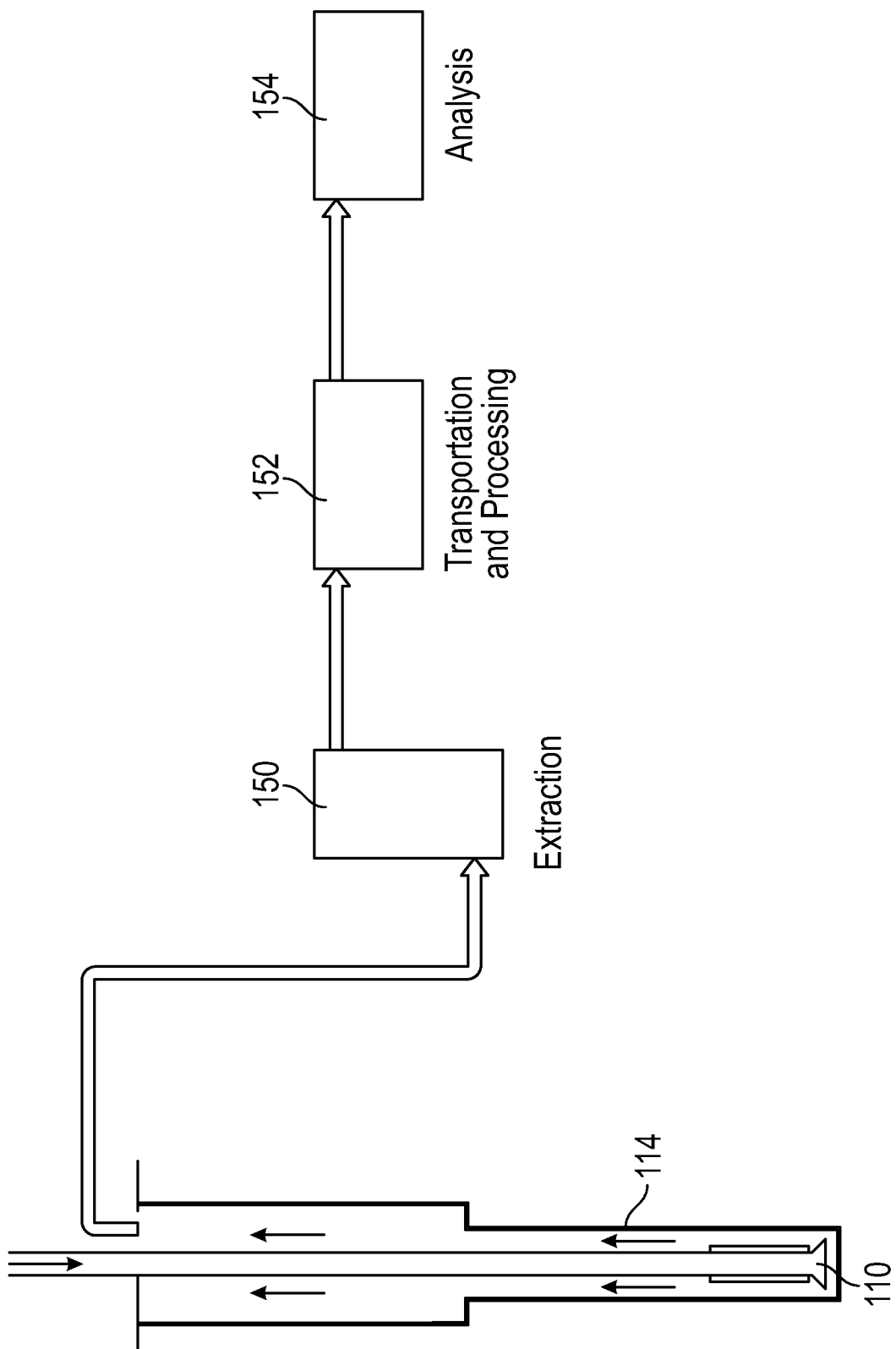
FIG. 1B shows a schematic of an illustrative gas acquisition chain for gas analysis during a drilling operation according to embodiments of the present disclosure.

FIG. 1A shows a partial schematic representation of an illustrative drilling system operating within a geological formation 100, while FIG. 1B shows a schematic of an illustrative gas acquisition chain for gas analysis during a drilling operation, according to embodiments of the present disclosure. While drilling through the subsurface 120 of the geological formation 100, rocks crushed by the drill-bit 110 can be carried by formation fluid (e.g., water, oil, and/or gas, e.g., helium 106) up the wellbore by drilling mud 112. The formation cuttings can be collected at a shale shaker (not shown) where the drilled cuttings are separated from the liquid drilling mud. The drilled cuttings brought to the surface are analyzed along with any fluids and gases present. FIG. 1B shows 3 phases of processing the drill cuttings: an extraction phase 150, a transport phase 152, and an analysis phase 154. For example, a gas trap may continuously sample and extract 150 gases from the drilling mud arriving at the surface. A gas line may be used to process and transport 152 the extracted gas to analyzers inside a mudlogging unit, for example, implemented within a surface-based computing device 160 (e.g., a server computer). Data resulting from the analysis 154 is stored by the mudlogging unit linked to a depth at which the material was extracted for creation of a mudlogging dataset corresponding to the drilling operation for the wellbore 114 under consideration.

Various types of analyzers are available for helium detection. However, desirable results may be obtained using gas chromatography (GC), which allows a gas component to elute on a column at a specific retention time. The gas chromatograph may be calibrated and checked regularly to ensure accuracy of measurement. The conventional surface data logging generally utilizes a non-volumetric barrel-type gas trap coupled with an analyzer configured to detect gases such as helium and C-n gases, for example, limited to the methane (C1) to pentane (C5) range. According to some embodiments, to analyze a wider range of gas compounds, more advanced gas equipment may be implemented, for example, to obtain more precise helium content information. Obtaining precise helium content data may be particularly useful during initial preparation/training of a machine learning (ML) model as described below.

While drilling a well 102 within a geological region 100, the drill bit 110 may encounter one or more fractures 104. Depending on the type of fracture 104, e.g., whether the fracture is open or sealed, helium 106, if present, will mobilize upwards to the wellbore 114 and migrate together with hydrocarbons and other components dissolved in the mud 112 resulting from the drilling operation.

Fractures 104 may, therefore, be considered as migration pathways for helium atoms 106, either from source rocks or from deeper sources. For example, helium 106 is often associated with nitrogen in ground water systems, with CO2 being associated with volcanic origins, and with methane (C1) being associated with petroleum sedimentary systems, etc. The analysis of gas extracted from the drilling mud 112 can provide desirable samples providing accurate concentration data for downhole gases coming from within the drilled formation.

For purposes of creating the mudlogging dataset, a sampling interval may be time-related to the turnover time of the instrument, allowing a record of highly detailed logs without the need of a beforehand depth-correlated sampling plan.

Figure 2B:
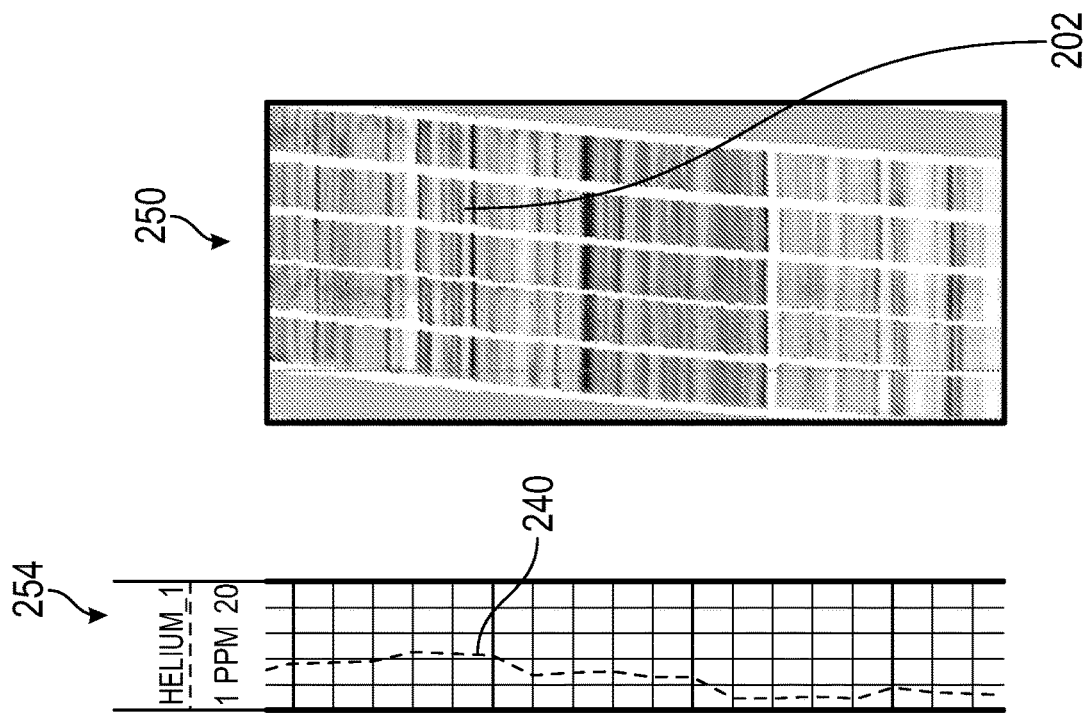
FIG. 2B shows an illustrative correlation between an identified induced fracture in an image and a graph showing an increase in helium at the location of the identified fracture, according to embodiments of the present disclosure.
Figure 2A:
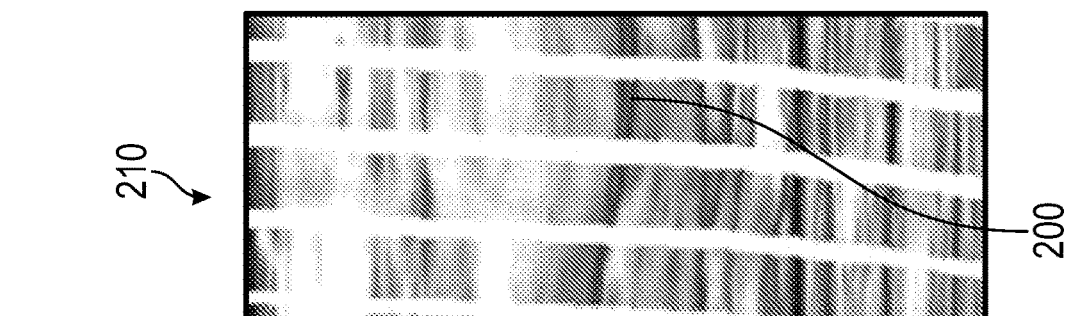
FIG. 2A shows an illustrative correlation between an identified natural fracture in an image and a graph showing an increase in helium at the location of the identified fracture, according to embodiments of the present disclosure.
Figure 2A:
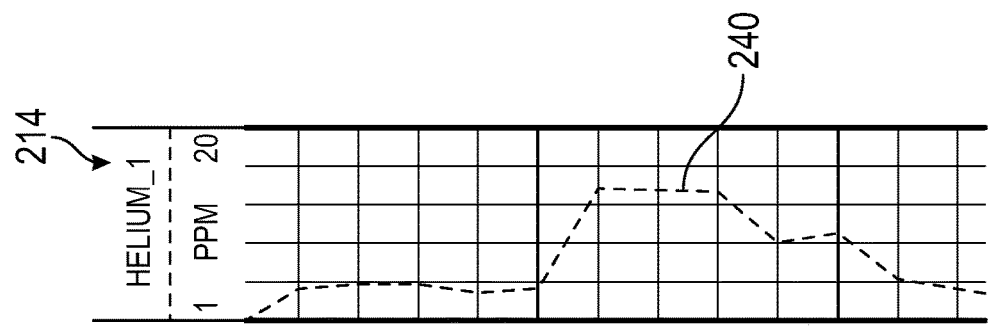
Figure 6A:
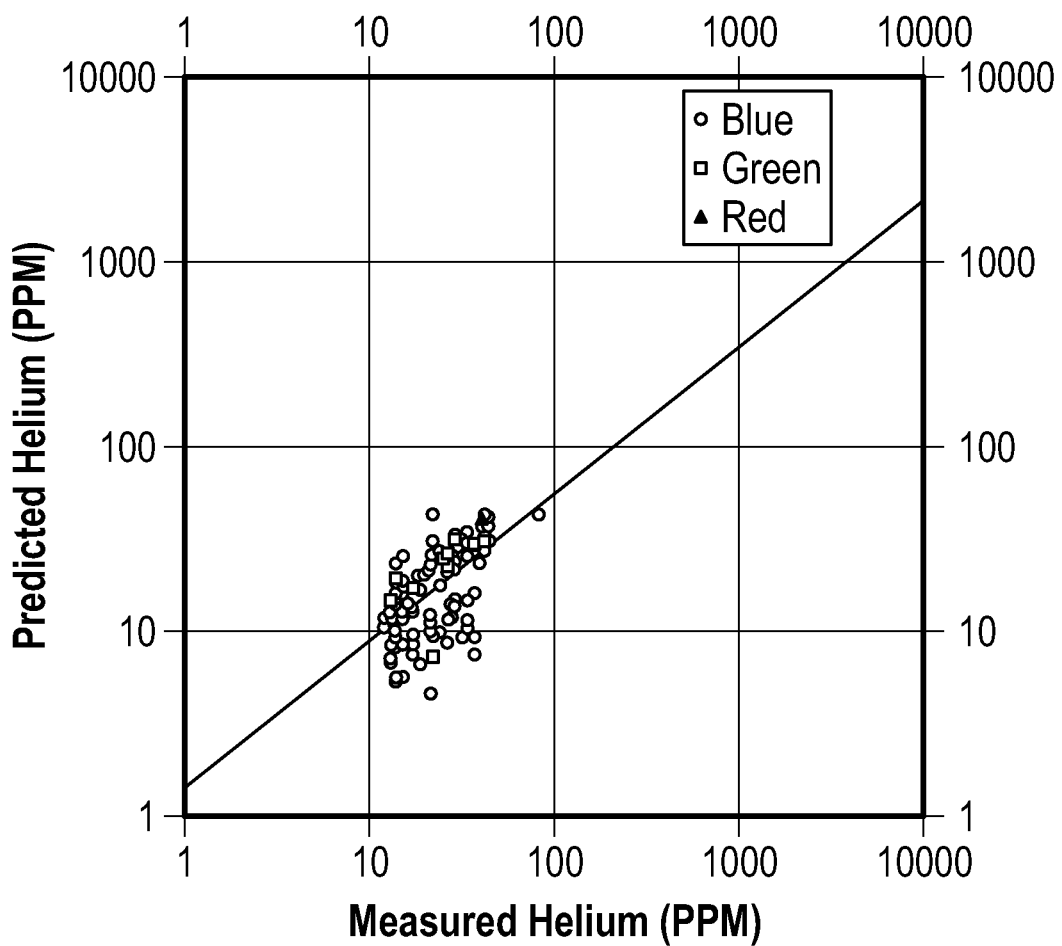
FIG. 6A shows a graph related to verification of a machine learning engine model based on predicted helium for a second unsampled wellbore interval at a desired error rate, according to embodiments of the present disclosure.
Figure 6B:
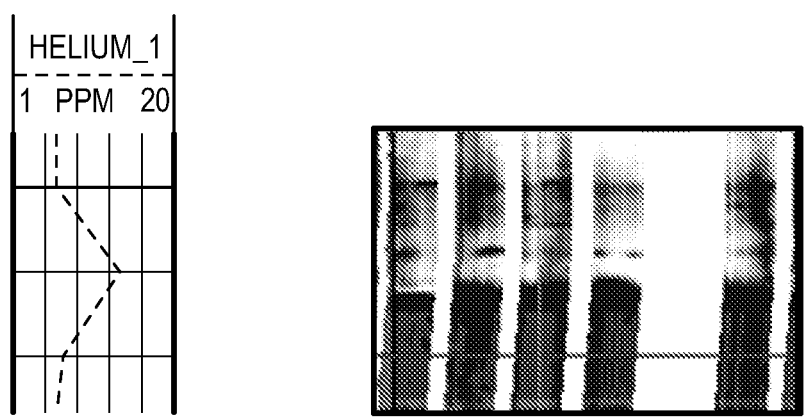
FIG. 6B shows an illustrative fracture prediction based on synthetic helium prediction made using mudlogging data from unsampled intervals, according to embodiments of the present disclosure.

FIG. 2A shows an illustrative correlation between an identified natural fracture 200 in an image 210 and a depth-referenced graph 214 showing gas analysis measurements for helium, while FIG. 2B shows an illustrative correlation between an identified induced fracture 202 in an image 250 and a graph 254 showing gas analysis measurements for helium. As used herein a natural fracture corresponds to fractures that exist in the natural form and are, for example, geologically driven being subjected to tectonic changes that affect their existence, while induced fractures are fractures that are induced during the drilling cycle by, for example, a high mud pressure causing the rock to fracture. A fracture zone 200, 202 can be marked as a high contrast reading in a curved form 240 relative to depth, as shown in the figures, for example, for purposes of ground truth labeling and/or prediction verification, among other things. Moreover, as can be seen in each of these figures, detected and/or predicted helium can be directly correlated with the presence or absence of a fracture zone 200, 202 within the formation 100. A fracture may be represented in an image by, for example, a horizontal streak or a shape (e.g., an S shape) which represents a rotational feature (e.g., for an image taken in 360 degrees) of the tool. As shown in FIG. 6B a spike of helium in the helium graph 254 corresponds to the horizontal streak in the picture to the right which showcases a fracture.

The images are taken in a cross-sectional format and can be correlated with the spikes in helium readings. Thus, similar to FIG. 6B, fractures can be seen in FIG. 2A where an S shaped horizontal dark spot where at 200. This is a natural fracture. FIG. 2B contains a similarly identified induced fracture where point 240 corresponds to a spike of helium reacting to the induced fracture 250. Thus, an increase in helium readings, as demonstrated by the curves and/or angles in the graphed helium content, can indicate a sweep into the formation which ultimately marks a potential fracture region. To establish an accurate measure of the method, images of fractures within the wellbore that are captured during the well logging process are compared against helium readings.

Figure 3:
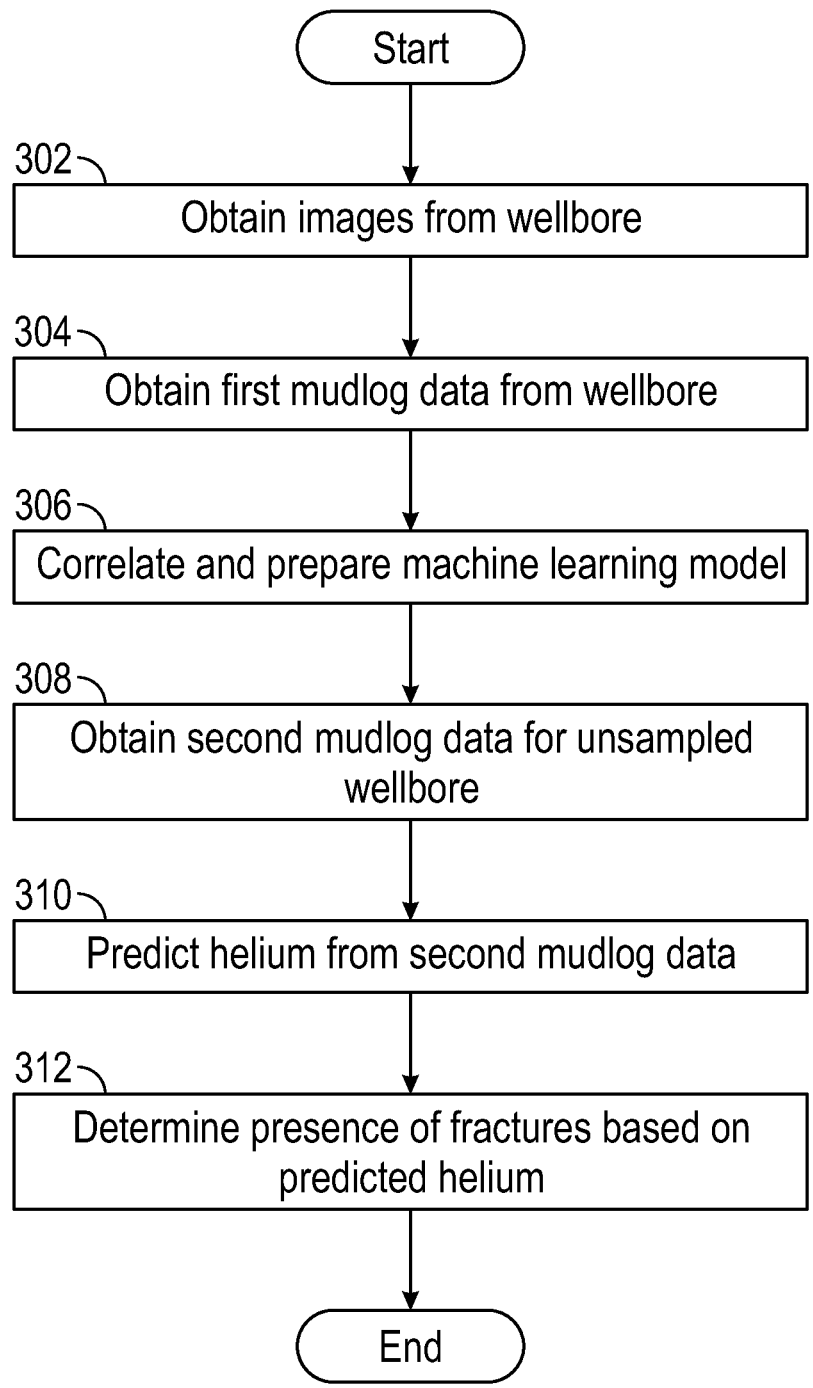
FIG. 3 is a flowchart highlighting an illustrative method for fracture prediction according to embodiments of the present disclosure.

FIG. 3 is a flowchart highlighting an illustrative method for fracture prediction according to embodiments of the present disclosure. A plurality of images may be obtained from the wellbore 114, for example, during the drilling operation (Step 302). For example, while the drill string 124 is within the wellbore 114, one or more sensors (e.g., cameras) may capture images of the inside wall of the wellbore and transmit the image data with corresponding depth information to the surface-based server 160, e.g., via wired or wireless connection. The server 160 may store the image data along with the corresponding depth information and may transmit the image/depth data to one or more other computing devices (e.g., remote cloud storage), as desired, for carrying out embodiments of the present disclosure.

Mudlogging data may be obtained for the well intervals from which the plurality of images were obtained (step 304). For example, a mudlogging dataset created during the drilling operation may be stored on the server 160 during creation of the mudlogging dataset. The mudlogging dataset corresponding to the sampled intervals at which the images were obtained may then be extracted and linked with the images on a depth basis such that mudlogging data is matched with a depth at which each respective image was obtained.

Figure 4:
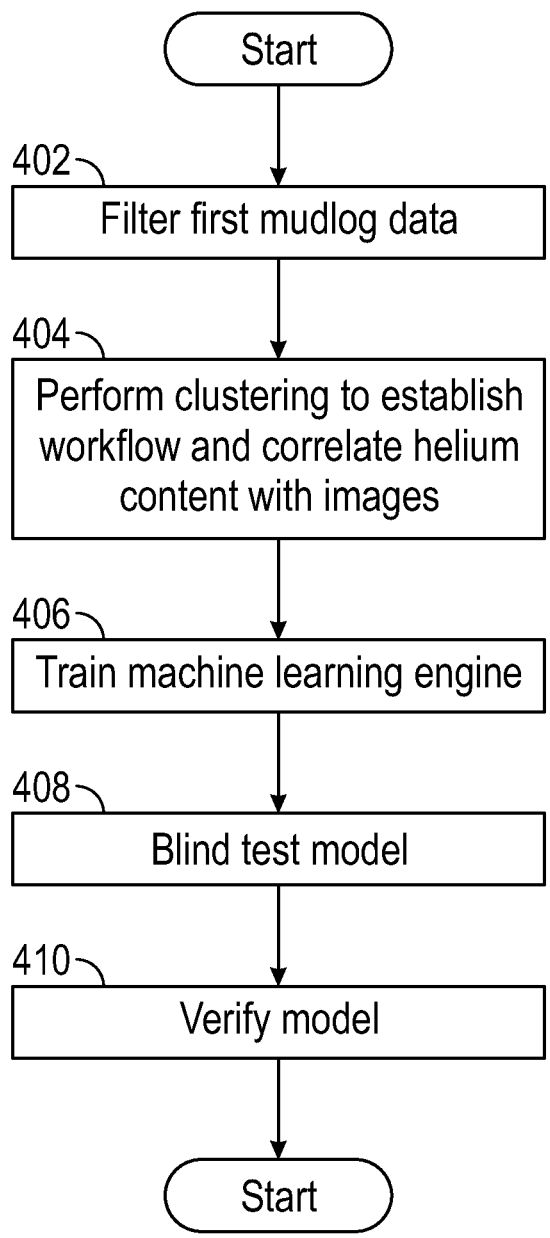
FIG. 4 is a flowchart highlighting an illustrative method for preparing a machine learning model according to embodiments of the present disclosure.

Next, a machine learning model implemented within a machine learning engine and correlating identified fractures present in the captured images and helium content data from the mudlogging data set is prepared (step 306). FIG. 4 is a flowchart highlighting an illustrative method for preparing a machine learning model according to embodiments of the present disclosure, and corresponds to step 306 of FIG. 3. An illustrative machine learning engine is also described in greater detail below with regard to FIG. 5.

According to some embodiments, a filtering process may be performed on the mudlogging dataset prior to correlating helium content from the first mudlogging dataset with the plurality of images (step 402). For example, the filtering process of embodiments disclosed herein may include making sure that all datasets gathered have been cleared of anomalies (e.g., erroneous measurements, unreasonable fracture planes, etc.) that jeopardize the quality of data. In addition, the filtering process may be used to ensure that the data covers an intended interval of the well. Where data does not meet the requirements, for example, by having gaps or not relating to the intended interval, such data may be filtered out (i.e., removed from the dataset).

Clustering of the helium data from the mudlogging dataset may then be performed to establish a workflow for the machine learning model (step 404). The clustering may be used to establish a link between an identified fracture and helium content data. For example, a n-automated clustering technique may be used, e.g., via multi-resolution graph-based clustering (MRGC) to perform the clustering for the helium data. According to such an implementation, helium content data from the mudlogging dataset may be ranked against borehole images in a statistical analysis that may, for example, compare offset data against a change impact per data point and rank the helium content data input per an associated impact value. This may be implemented within the context of a k-Nearest Neighbor (k-NN) machine learning engine and the change impact per data point may be used to determine a weight value implemented therein as described below.

According to embodiments of the present disclosure, the offset data may include patterns determined from the mudlogging dataset that refer to an identified feature (e.g., a fracture) within a rock matrix corresponding to a depth at which the current data was captured. Similar patterns may be identified and captured accordingly. The identified patterns can then be ranked based on similar data against a depth within the wellbore such that a feature to helium pattern recognizable by the system is generated and clustered.

A ranking of different identified patterns is then created where the number k of the k-NN corresponds to a normalized distance between a point to be predicted and its nearest neighbors. MRGC is a methodology of automated clustering based of the K-nearest neighbors. It is a graphical representation allowing users to control the required level of details. The prediction consists of two steps. First is a non-supervised criterion of clustering using image logs. The second is a supervised approach using gamma ray (GR) and methane readings (c2) to predict helium (He). The clustering is only used to establish a link between finding fracture and helium readings. The tool utilizes inputs that are always available in the prediction process. The inputs are image logs, and GR, and Helium. The system automatically also identifies associated inputs; which are inputs that are available in the training phase only. These inputs are reading the processed image that have a pattern of a fracture zone. The fracture zone is marked as a high contrast reading in a curved form relative to depth. The next step is to utilize GR and Basic mudlogging input (methane C2) to predict helium output. For example, using MRGC, a selection of common patterns and offset patterns corresponding to plots of the helium data against wellbore depth that show a similar theme. Offset patterns may be obtained through ranking of similarities (e.g., data v. depth). In one or more embodiments, k is a number that represents an average distance between points that result in certain data clustering. In one or more embodiments, it is determined that a k value equal to 4 produces a desirable clustering fit during testing of embodiments of the present disclosure; however, other suitable values for k may also be implemented without departing from the scope herein.

The MRGC outputs the number of the clusters and uses the input data (e.g., helium content data) to propagate the determined number of the clusters (i.e., the output). According to some embodiments, an assessment of how many clusters are achieved is performed using a trial and error method going back and forth and assessing an error margin with different numbers of clusters to determine which obtains a "best" fit, where best corresponds to the most effective number.

Figure 5:
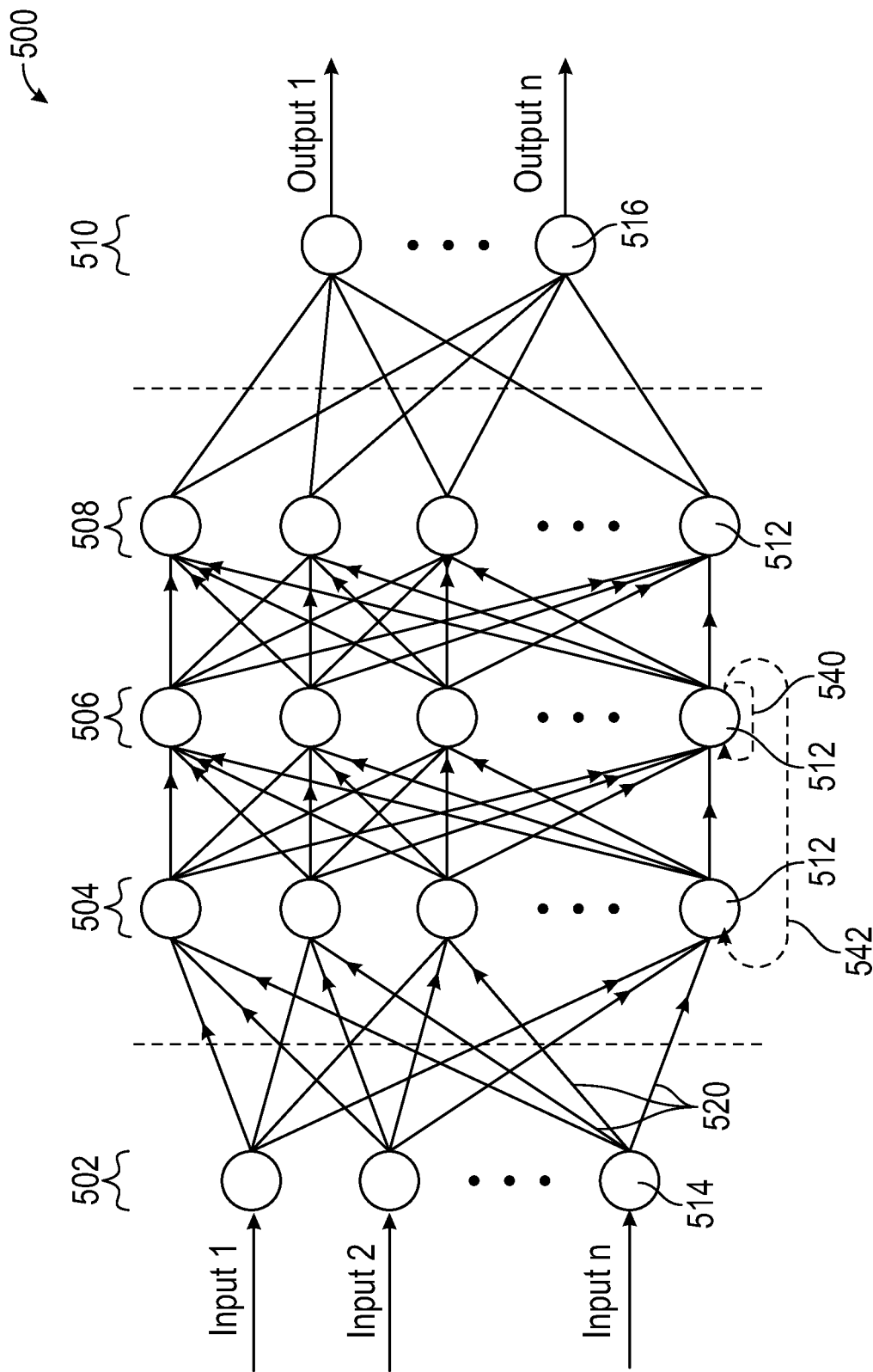
FIG. 5 shows an illustrative architecture for a neural network configured for fracture predictions according to embodiments of the present disclosure.

FIG. 5 shows an illustrative architecture for a neural network implemented as a machine learning engine and configured for fracture predictions according to embodiments of the present disclosure. A neural network 500 uses a series of mathematical functions to make predictions based on observed data (e.g., as defined by a training set). A neural network 500 may include an input layer 502, hidden layers, such as a first hidden layer 504, a second hidden layer 506, a third hidden layer 508, and an output layer 510. Each layer represents a vector where each element within each vector is represented by an artificial neuron, such as artificial neurons 512 (hereinafter also "neuron"). The input layer 502 may receive an observed data vector x where each neuron, such as neuron 514, within the input layer 502 receives one element $x_i$ within x. Each element is a value that represents a datum that is observed. The vector x may be called "input data". FIG. 5 displays the input data or vector x as elements $x_1, x_2, x_i \ldots x_n$, where $x_1$ may be, for example, image data, mudlogging data consisting of C-n gas data, and GR data representing a sample at a first depth, and $x_2$ may be image data, mudlogging data consisting of C-n gas data, and GR data representing a sample at a second depth, etc. Additional associated inputs may be automatically identified by the system and may correspond to processed image data in which fracture zone patterns have been identified (e.g., ground truth labelling and/or prediction). Such associated inputs may be available, for example, only at the time of training of the machine learning engine.

The output layer 510 may represent the vector y where each neuron, such as neuron 516, within the output layer 510 represents each element $y_j$ within y. The vector y may be called "output data." FIG. 5 displays the output data or vector y with t elements, where an element $y_j$ may be a value that represents the predicted helium content at a $j^{th}$ depth based on the mudlogging data at the sample depth. For example, $y_1$ and $y_2$ may represent a predicted helium content at a first and second depth, respectively. In this embodiment, the neural network 500 may solve a regression problem where all outputs $y_t$ may depend on a temporal or spatial configuration as determined from the components and characteristics determined as described above.

Neurons in the input layer 502 may be connected to neurons in the first hidden layer 504 through connections, such as connections 520. A connection 520 may be analogous to a synapse of the human brain and may have a weight associated to it. The weights for all connections 520 between the input layer 502 and the first hidden layer 504 make up a first array of weights w, with elements $w_{ik}$:

$$w = \begin{bmatrix} w_{11} & w_{12} & w_{1k} & w_{1L} \\ w_{21} & w_{22} & w_{2k} & w_{2L} \\ w_{i1} & w_{i2} & w_{ik} & w_{iL} \\ w_{n1} & w_{n2} & w_{nk} & w_{nL} \end{bmatrix}$$

where k indicates a neuron in the hidden first hidden layer and L is the total number of neurons in the first hidden layer for the embodiment shown in FIG. 5. The elements in each column are the weights associated with the connections 520 between each of the n elements in vector x that propagate to the same neuron k 512 in the first hidden layer 504. The value of a neuron k, $a_k$, in the first hidden layer may be computed as $$a_k = g_k\left(b_k + \sum_i x_i w_{ik}\right), \quad \text{Equation (1)}$$

where, in addition to the elements of the input vector x and the first array of weights w, elements from a vector b, which has a length of L, and an activation function $g_k$ are referenced. The vector b represents a bias vector and its elements may be referred to as biases. In some implementations, the biases may be incorporated into the first array of weights such that Equation (1) may be written as $a_k = g_k (\Sigma_i x_i w_{ik})$.

Each weight $w_{ik}$ within the first array of weights may amplify or reduce the significance of each element within vector x and may correspond to, for example, change impact per data point as determined above. Some activation functions may include the linear function g(x)=x, sigmoid function $$g(x) = \frac{1}{1+e^{-x}},$$

and rectified near unit function g(x)=max(0, x), however, many additional functions are commonly employed. Every neuron in a neural network may have a different associated activation function. Often, as a shorthand, activation functions are described by the function $g_k$ by which it is composed. That is, an activation function composed of a linear function may simply be referred to as a linear activation function without undue ambiguity.

Similarly, the weights for all connections 520 between the first hidden layer 504 and the second hidden layer 506 make up a second array of weights. The second array of weights will have L rows, one for each neuron in the first hidden layer 504, and a number of columns equal to the number of neurons in the second hidden layer 506. Likewise, a second bias vector and second activation functions may be defined to relate the first hidden layer 504 to the second hidden layer 504. The values of the neurons for the second hidden layer 506 are likewise determined using Equation (1) as before, but with the second array of weights, second bias vector, and second activation functions. Similarly, values of the neurons for the third hidden layer 508 may be likewise determined using Equation (5) as before, but with the third array of weights, third bias vector, and third activation functions. This process of determining the values for a hidden layer based on the values of the neurons of the previous layer and associated array of weights, bias vector, and activation functions is repeated for all layers in the neural network. As stated above, the number of layers in a neural network is a hyperparameter of the neural network 500.

It is noted that FIG. 5 depicts a simple and general neural network 500. In some embodiments, the neural network 500 may contain specialized layers, such as a normalization layer, or additional connection procedures, like concatenation. One skilled in the art will appreciate that these alterations do not exceed the scope of this disclosure. For example, neural network 500 with only connections 520 passing signals forward from the input layer 502 to the first hidden layer 504, from the first hidden layer 504 to the second hidden layer 506 and so forth constitutes a feed-forward neural network. However, in some embodiments a neural network may have any number of connections, such as connection 540, that passes the output of a neuron 514 backward to the input of the same neuron 512, and/or any number of connections 542 that passes the output of the neuron 512 in a hidden layer, such as hidden layer 506 backward to the input of a neuron in a preceding hidden layer, such as hidden layer 504. A neural network with backward-passing connections, such as connection 540 and 542 may be termed a recurrent neural network.

For a neural network 500 to complete a "task" of predicting an output from an input, the neural network 500 is first trained (step 406). Training may be defined as the process of determining the values of all the weights and biases for each weight array and bias vector encompassed by the neural network 500.

To begin training the weights and biases are assigned initial values. These values may be assigned randomly, assigned according to a prescribed distribution, assigned manually, or by some other assignment mechanism. Once the weights and biases have been initialized, the neural network 500 may act as a function, such that it may receive inputs (e.g., image data, GR data, and helium data) and produce an output. As such, at least one input is propagated through the neural network 500 to produce an output.

Training of the model may be supervised or unsupervised. According to a supervised training plan, a training dataset is composed of labeled inputs and associated target(s), where the target(s) represent the "ground truth", or the otherwise desired output. That is, the training dataset may be a plurality of input data and a plurality of output data either of which are observed or simulated. The neural network 500 output is compared to the associated input data target(s). The comparison of the neural network 500 output to the target(s) is typically performed by a so-called "loss function"; although other names for this comparison function such as "error function", "objective function", "misfit function", and "cost function" are commonly employed. Many types of loss functions are available, such as the mean-squared-error function, however, the general characteristic of a loss function is that the loss function provides a numerical evaluation of the similarity between the neural network 500 output and the associated target(s). The loss function may also be constructed to impose additional constraints on the values assumed by the weights and biases, for example, by adding a penalty term, which may be physics-based, or a regularization term. Generally, the goal of a training procedure is to alter the weights and biases to promote similarity between the neural network 500 output and associated target(s) over the training dataset. Thus, the loss function is used to guide changes made to the weights and biases, typically through a process called "backpropagation".

While a full review of the backpropagation process exceeds the scope of this disclosure, a brief summary is provided. Backpropagation consists of computing the gradient of the loss function over the weights and biases. The gradient indicates the direction of change in the weights and biases that results in the greatest change to the loss function. Because the gradient is local to the current weights and biases, the weights and biases are typically updated by a "step" in the direction indicated by the gradient. The step size is often referred to as the "learning rate" and need not remain fixed during the training process. Additionally, the step size and direction may be informed by previously seen weights and biases or previously computed gradients. Such methods for determining the step direction are usually referred to as "momentum" based methods.

Once the weights and biases have been updated, or altered from their initial values, through a backpropagation step, the neural network 500 will likely produce different outputs. Thus, the procedure of propagating at least one input through the neural network 500, comparing the neural network 500 output with the associated target(s) with a loss function, computing the gradient of the loss function with respect to the weights and biases, and updating the weights and biases with a step guided by the gradient, is repeated until a termination criterion is reached. Common termination criteria are: reaching a fixed number of updates, otherwise known as an iteration counter; a diminishing learning rate; noting no appreciable change in the loss function between iterations; reaching a specified performance metric as evaluated on the data or a separate hold-out dataset. Once the termination criterion is satisfied, and the weights and biases are no longer intended to be altered, the neural network 500 is said to be "trained".

According to embodiments of the present disclosure, the k-NN is trained with the clustered training dataset corresponding to the statistically ranked data from the MRGC step clustered by similarities in patterns per data point. The k-NN may allow for setting the number k of the k-NN, which is the normalized distance between the data point to be predicted and its nearest neighbors, and the k-NN depends on both the data points and the MRGC.

A supervised approach using gamma ray data and methane readings (C2) from the mudlogging dataset may then be used to predict helium to "blind test" the model generated for the machine learning engine (step 408). For example, helium content predictions may be made from new mudlogging datasets generated from across one or more wellbores generated in a geological formation. Such mudlogging may be performed such that only basic mudlogging (i.e., not advanced mudlogging data analysis) data is used. In other words, the mudlogging data may consist solely of C-n gas data, and may even be limited to C2 gas content data. From this information, synthetic helium readings may be predicted, and compared to analytically captured helium readings and image logs to determine the validity of the synthetically generated helium content data. Blind testing may be performed based on, for example, actual captured data from the field (e.g., as provided by advanced mudlogging data) and compared to actual fractures determined by human analysis. In this way, actual vs. trained data can be compared to calculate a margin of error present in the model. In one or more embodiments, 475,000 data points from multiple wells are trained and then blind tested for verification purposes. The result is the pattern of reading of helium that is aligned with the pattern of fractures within an image along 10 ft plus or minus of depth. If an angled (curved) region is present, then fracture is identified and readings of helium are captured then learned. The result is to be able to identify fractures from a standalone helium reading along any newly drilled interval.

Alternatively, or in addition, during the verification phase, information may be extracted from an advanced mudlogging dataset and stored, such as, for example, C-n gas data and/or GR data, such that only desired data is provided during verification, while enabling verification of results predicted from the reduced dataset. For example, only C-n gas data and/or GR data may be used for predicting helium content of the gas, with the advanced mudlogging data providing sufficient information (e.g., actual helium content) to verify the predictions.

A number of desirable training points may be arbitrarily selected (e.g., between 300,000 and 600,000 data points), as from among multiple wellbores. These are used for training to determine resulting patterns of helium content data that is aligned with patterns of fractures within a respective image along, for example, a desired depth range (e.g., 3 meters plus or minus). Where an angled or curved region in the helium content data is present, then a fracture can be identified and the helium content data for such a pattern captured and "learned" by the model. According to some embodiments, some identifications can be visually verified by a user as desired.

Once a margin of error is determined, the model may be verified (step 410) based on a predetermined desired margin of error. For example, a desired margin of error may be set to 75 percent (%) for determining whether a prediction of fractures using predicted helium content is successful. The model may then be verified to ensure that the patterns for fracture based on helium content data is determined at the desired error rate with regard to actual, known data. FIG. 6A illustrates the accuracy of the predicted model compared to the original data. The more aligned the data on the straight line of FIG. 6A, the less error is present. FIG. 6B illustrates the spike of Helium readings when a natural fracture is determined based on the disclosed workflow. More specifically, FIG. 6B shows predicted helium (He) spikes.

Returning to FIG. 3, following generation, training, and verification of the machine learning engine model, new mudlogging data, for example, basic mudlogging data lacking helium content data and other information, may be obtained from any number of wellbores, referred to as unsampled intervals (step 308). Such mudlogging data may be obtained in any suitable manner, for example, as described above with regard to the first mudlogging dataset.

Once obtained, the second mudlogging data set may be provided as input to the machine learning engine model, and helium content predicted based thereof (step 310). Based on the predicted helium content and previously determined pattern correlations, the model may then predict likelihood of the presence of a fracture at a depth corresponding to the mudlogging data under consideration (step 312). For example, FIG. 6B shows an illustrative fracture prediction based on synthetic helium prediction made using mudlogging data from unsampled intervals.

By implementing embodiments of the present disclosure, automation of identify fracture identification via artificial intelligence can be implemented, and human intervention time (e.g., for cross-checking, etc.) can be greatly reduced.

Figure 7:
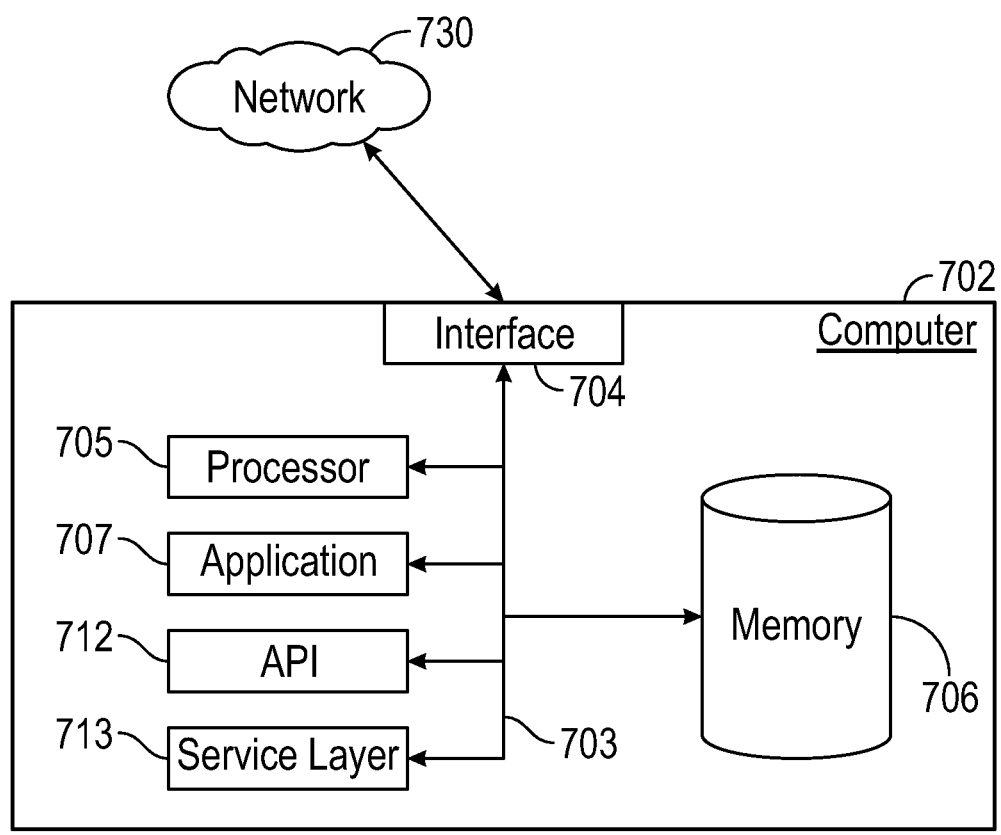
FIG. 7 depicts a block diagram of a computer system configured to provide computational functionalities associated with described algorithms, methods, functions, processes, flows, and procedures as described in this disclosure, according to one or more embodiments.

FIG. 7 depicts a block diagram of a computer system 702 used to provide computational functionalities associated with described algorithms, methods, functions, processes, flows, and procedures as described in this disclosure, according to one or more embodiments. For example, the computer system 702, and the processor of the computer system, may be used to perform one or more steps of the flowchart (calculations, determinations, etc.) in FIGS. 1 and 3 and to implement the machine learning engine of FIG. 5.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may include a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713. The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or another suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730. Generally, the interface 704 includes logic encoded in software or hardware (or a combination of software and hardware) and operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes at least one computer processor 705. Although illustrated as a single computer processor 705 in FIG. 7, two or more processors may be used according to particular needs, desires, or particular implementations of the computer 702. Generally, the computer processor 705 executes instructions and manipulates data to perform the operations of the computer 702 and any machine learning networks, algorithms, methods, functions, processes, flows, and procedures as described in the instant disclosure.

The computer 702 also includes a memory 706 that holds data for the computer 702 or other components (or a combination of both) that can be connected to the network 730. For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing a computer 702, wherein each computer 702 communicates over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Although only a few example embodiments have been described in detail above, those skilled in the art will readily appreciate that many modifications are possible in the example embodiments without materially departing from the scope of the disclosure. Accordingly, all such modifications are intended to be included within the scope of this disclosure as defined in the following claims.

What is claimed:
1. A method for identifying fractures within a geological formation, comprising:
  obtaining a plurality of images from within a first well located within the geological formation, wherein at least one image of the plurality of images comprises an identified fracture in the geological formation;
  obtaining a first mudlogging dataset associated with the plurality of images;
  correlating one or more helium measurements from the first mudlogging dataset with each image of the plurality of images via a machine learning engine to train a machine learning model to obtained a trained machine learning model;
  obtaining, by the trained machine learning model, a second mudlogging dataset associated with an interval of a second well; and
  determining a presence of one or more fractures in the interval of the second well by the machine learning model based on helium content determined from the second mudlogging dataset.
2. The method of claim 1, wherein the correlating is performed at least in part using a multi-resolution graphical clustering (MRGC).

3. The method of claim 1, wherein the second mudlogging dataset consists of gamma ray data and C-n gas data.

4. The method of claim 1, wherein the correlating is performed using a first step of unsupervised clustering based on the image logs, and a second step of a supervised helium prediction based on gamma ray data and C-n gas data comprised by the first mudlogging dataset.

5. The method of claim 4, further comprising predicting the helium content based exclusively on the C-n gas data.

6. The method of claim 5, wherein inputs to the machine learning model during the correlating comprise the helium content, the gamma ray data, and at least one image of the plurality of images.

7. The method of claim 1, wherein the machine learning engine comprises a k-nearest neighbor neural network trained with a clustered training dataset, the clustered training dataset comprising statistically ranked data prepared using an MRGC process to find similarities in patterns per data point.

8. The method of claim 7, wherein the MRGC process uses a mudlogging helium data ranking to compare offset data from an image of the plurality of images to a weight value corresponding to change impact per data point and to assign a rank to an input based on the weight value.

9. The method of claim 1, further comprising validating the machine learning model based on actual captured helium data from a third mudlogging dataset corresponding to a plurality of wellbores within the geological formation; and determining a margin error based on the validating.

10. The method of claim 1, wherein the machine learning engine is configured to identify associated inputs from the first mudlogging dataset during the correlating.

11. A non-transitory computer readable medium storing instructions that when executed by a processor cause the processor to carry out a method for identifying fractures within a geological formation, the method comprising:
obtaining a plurality of images from within a first well located within the geological formation, wherein at least one image of the plurality of images comprises an identified fracture in the geological formation;
obtaining a first mudlogging dataset associated with the plurality of images;
correlating one or more helium measurements from the first mudlogging dataset with each image of the plurality of images via a machine learning engine to prepare a machine learning model;
obtaining, by the machine learning model, a second mudlogging dataset associated with an interval of a second well; and
determining a presence of one or more fractures in the interval of the second well by the machine learning model based on a helium content determined from the second mudlogging dataset.

12. The non-transitory computer readable medium of claim 11, wherein the correlating is performed at least in part using a multi-resolution graphical clustering (MRGC).

13. The non-transitory computer readable medium of claim 11, wherein the second mudlogging dataset consists of gamma ray data and C-n gas data.

14. The non-transitory computer readable medium of claim 11, wherein the correlating is performed using a first step of unsupervised clustering based on the image logs, and a second step of a supervised helium prediction based on gamma ray data and C-n gas data comprised by the first mudlogging dataset.

15. The non-transitory computer readable medium of claim 14, further comprising predicting the helium content based exclusively on the C-n gas data.

16. The non-transitory computer readable medium of claim 15, wherein inputs to the machine learning model during the correlating comprise the helium content, the gamma ray data, and at least one image of the plurality of images.

17. The non-transitory computer readable medium of claim 11, wherein the machine learning engine comprises a k-nearest neighbor neural network trained with a clustered training dataset, the clustered training dataset comprising statistically ranked data prepared using an MRGC process to find similarities in patterns per data point.

18. The non-transitory computer readable medium of claim 17, wherein the MRGC process uses a mudlogging helium data ranking to compare offset data from an image of the plurality of images to a weight value corresponding to change impact per data point and to assign a rank to an input based on the weight value.

19. The non-transitory computer readable medium of claim 11, further comprising validating the machine learning model based on actual captured helium data from a third mudlogging dataset corresponding to a plurality of wellbores within the geological formation; and determining a margin error based on the validating.

20. The non-transitory computer readable medium of claim 11, wherein the machine learning engine is configured to identify associated inputs from the first mudlogging dataset during the correlating.

* * * * *